Dec. 9, 1924.

N. ST. PETER 1,518,282

MACHINE FOR MOLDING ARTICLES FROM PLASTIC MATERIAL

Filed Oct. 22, 1923

INVENTOR
Napoleon St. Peter

INVENTOR
Napoleon St. Peter

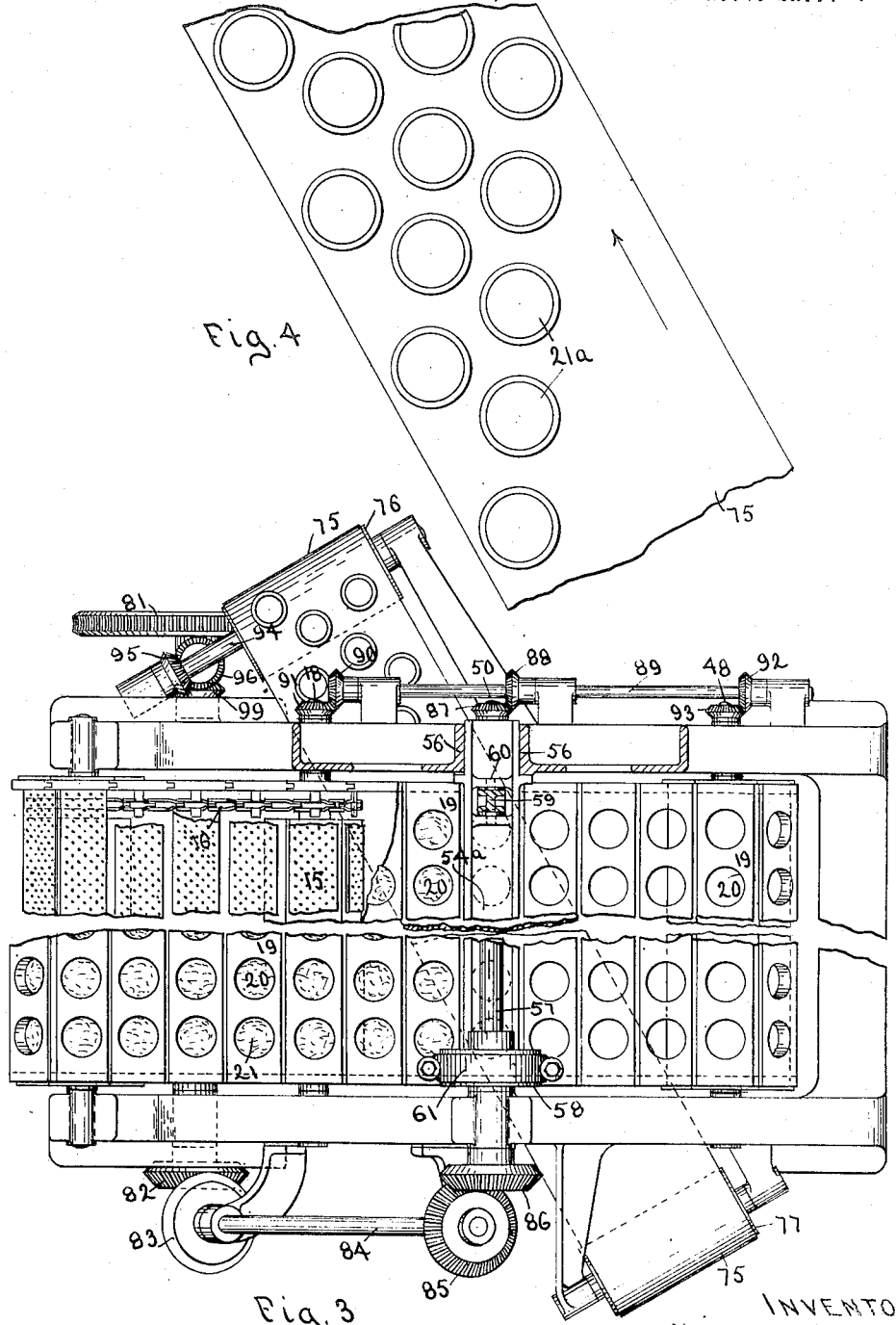

Dec. 9, 1924. 1,518,282
N. ST. PETER
MACHINE FOR MOLDING ARTICLES FROM PLASTIC MATERIAL
Filed Oct. 22, 1923 5 Sheets-Sheet 4
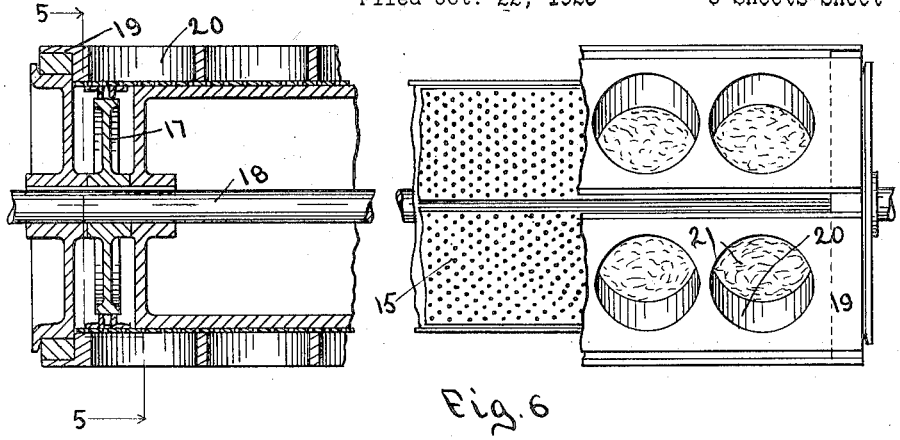
Fig. 6
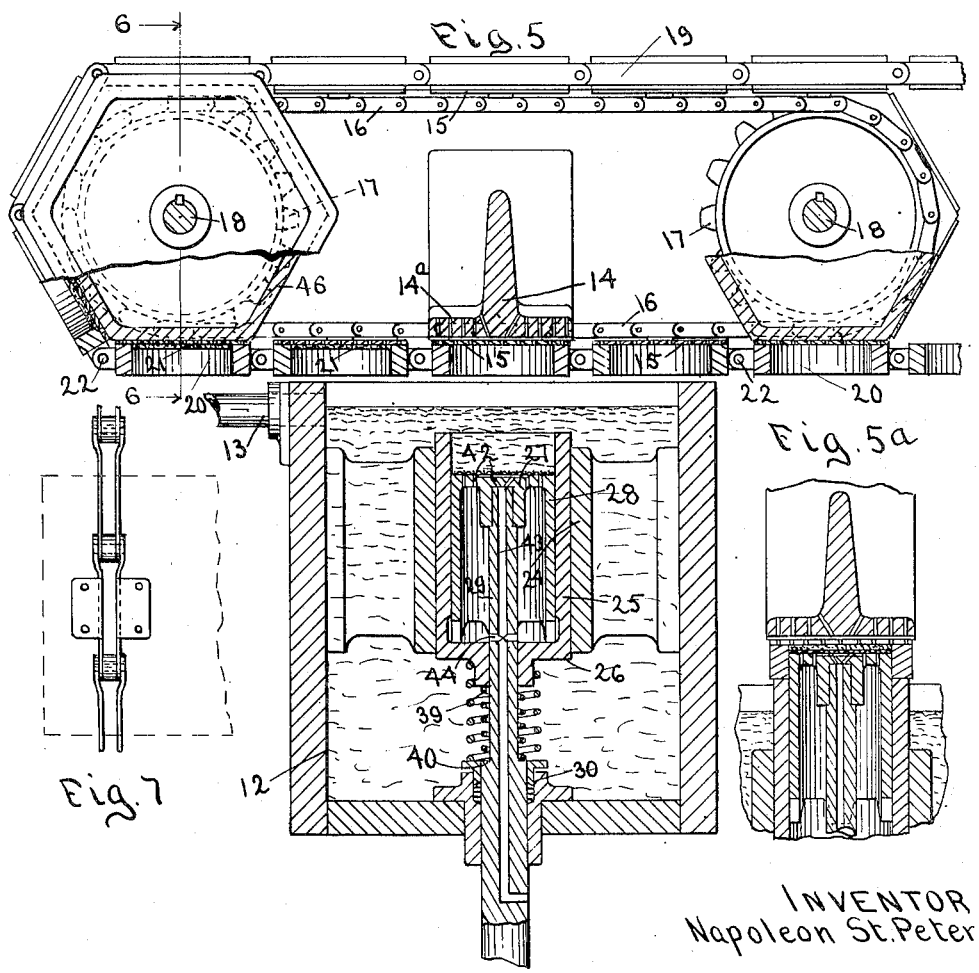
Fig. 5
Fig. 5a
Fig. 7
INVENTOR
Napoleon St. Peter

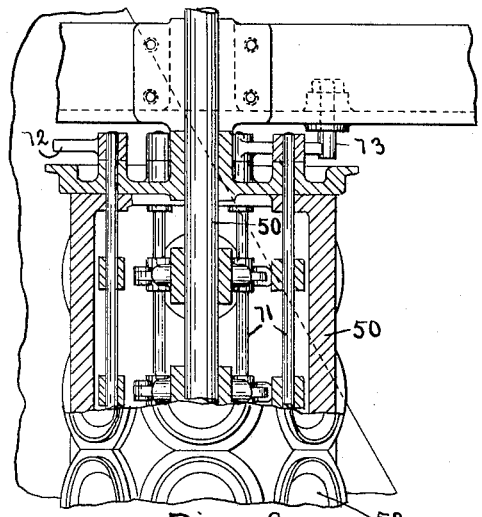
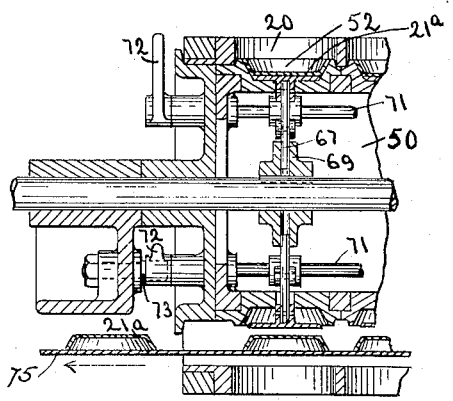
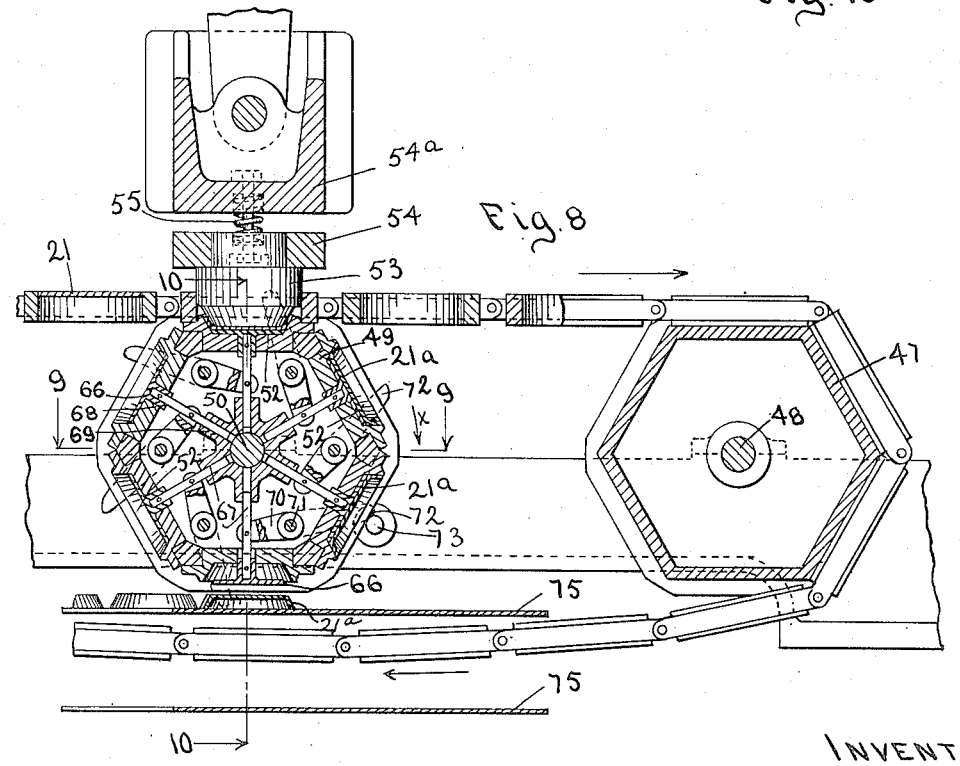

Patented Dec. 9, 1924.

1,518,282

UNITED STATES PATENT OFFICE.

NAPOLEON ST. PETER, OF FAIRFIELD, MAINE, ASSIGNOR TO WILLIAM D. HUNT, OF BROOKLINE, MASSACHUSETTS.

MACHINE FOR MOLDING ARTICLES FROM PLASTIC MATERIAL.

Application filed October 22, 1923. Serial No. 669,922.

*To all whom it may concern:*

Be it known that I, NAPOLEON ST. PETER, a citizen of the United States, residing at Fairfield, in the county of Kennebec and State of Maine, have invented new and useful Improvements in Machines for Molding Articles from Plastic Material, of which the following is a specification.

This invention relates to a machine for molding pie plates and other articles from plastic material such as wood pulp, by a continuous operation. The invention is embodied in a machine which comprises a tank adapted to contain wood pulp in a fluid condition, mechanism within and immediately above the tank adapted to form blanks by a molding and pressing operation from pulp in the tank, and forming molds outside the tank, the said blank-forming mechanism including means for carrying the blanks from a point over the tank to the forming molds, which convert the blanks into articles of manufacture.

Of the accompanying drawings forming a part of this specification,—

Fig. 3 is a top plan view.

Fig. 4 is a fragmentary top plan view showing a portion of the conveyor belt which receives the finished articles from the machine.

Fig. 5 is a sectional view on a larger scale, showing portions of the machine.

Figure 1:
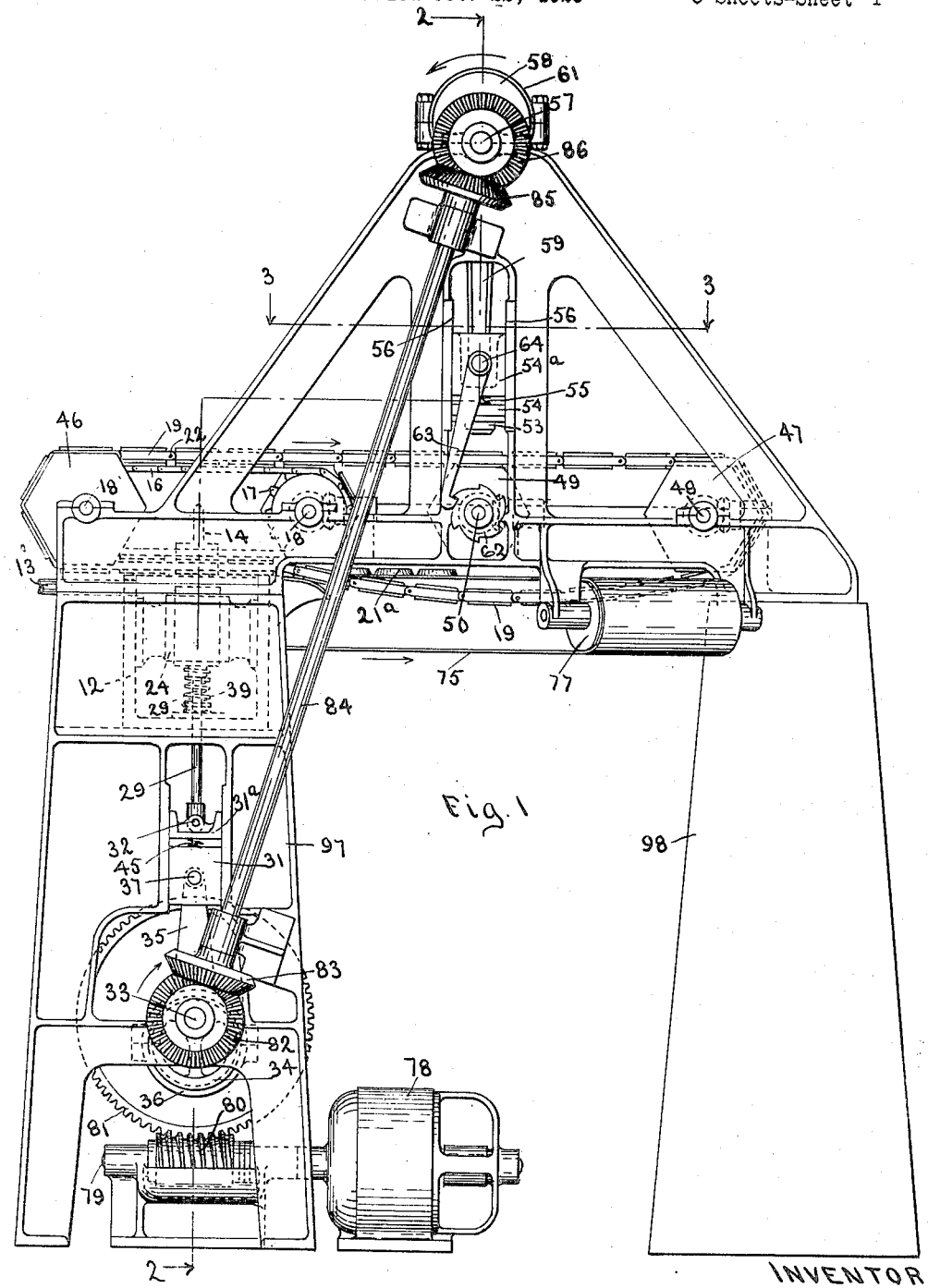
Fig. 1 is a side elevation of a machine embodying the invention.

Fig. 5ª is a view similar to portions of Fig. 5 showing a different stage of the operation.

Fig. 6 is a fragmentary view partly in side elevation and partly in section on the plane of line 6—6 of Fig. 5.

Fig. 7 is a detail view showing a portion of one of the perforated plates hereinafter described, and means for connecting it with other plates to form an endless chain.

Fig. 8 is a sectional view showing the portion of the machine omitted from Fig. 5.

Fig. 9 is a section on line 9—9 of Fig. 8.

Fig. 10 is a section on line 10—10 of Fig. 8.

The same reference characters indicate the same parts in all of the figures.

12 (Fig. 5) designates a tank to which pulp is forced through a feed pipe 13 by a pump (not shown) the pulp being diluted with water so that it flows freely. The tank is an element of means for forming blanks from pulp in the tank, the blanks being in this instance flat disks each adapted to be converted by the forming dies hereinafter described, into pie plates. The invention is not limited however to a machine adapted to form pie plate blanks and to convert the same into pie plates, and the machine may be organized to manufacture other articles by forming blanks in a tank and conveying the blanks from the tank to forming dies located outside the tank.

Spaced above the tank is a fixed bar 14 which faces downward and constitutes an inverted bed or abutment adapted to support against upward pressure the members of an endless chain or series of perforated plates 15. These plates are secured to links of two sprocket chains 16 mounted on sprocket wheels 17 which are fixed to horizontal shafts 18 journalled in fixed bearings on the frame of the machine. The wheels 17 are at opposite sides of the bar 14 and are rotated step by step, so that each plate 15 is moved to position under the bar and held there during the blank forming operation hereinafter described. Movable with the endless series of perforated plates 15 is an endless series of container plates 19 each having a plurality of circular openings 20 arranged in a straight row and constituting the walls of inverted blank receiving cavities the bottoms of which are formed by the perforated plates as shown by Fig. 5, said receivers being adapted to contain a plurality of pie plate blanks 21. The contaner plates 19 are connected to form an endless chain by pintles 22 engaged with ears on said plates. The chain of container plates surrounds the chain of perforated plates 15, and is considerably longer than the latter as shown by Fig. 1. The two chains are moved in unison so that each of the perforated plates 15 and the accompanying container plates 19 are first moved to position under the bar 14 and above the tank and held in said position for a predetermined period while blanks are formed in the said cavities. The length of the perforated plate is such that it extends across all of the openings 20 in the container plate. Charges of pulp each sufficient for a blank 21 are inserted in the cavities formed by the plates 15 and 19 by means embodied in a row or series of fixed vertical guides 24 (Fig. 5) within the tank 12, spaced from and in axial alinement with the said cavities, and vertically reciprocated compound plungers in said guides each adapted when rising, to segregate a charge of pulp and force it into one of said cavities, the charge being pressed against the perforated plate 15 so that the sides of the blank 21 are formed by said plate and by one member of the plunger, and the margin of the blank are formed by the other member of the plunger as indicated by Fig. 5ª, the blank being caused to adhere to the container plate by the frictional contact of its margin with the wall of the opening 20, so that when the plates 15 and 19 are moved forward or to the left as viewed in Fig. 5, the blank is prevented from falling from the cavity when the plunger is lowered, and moves forward with the plates.

Figure 2:
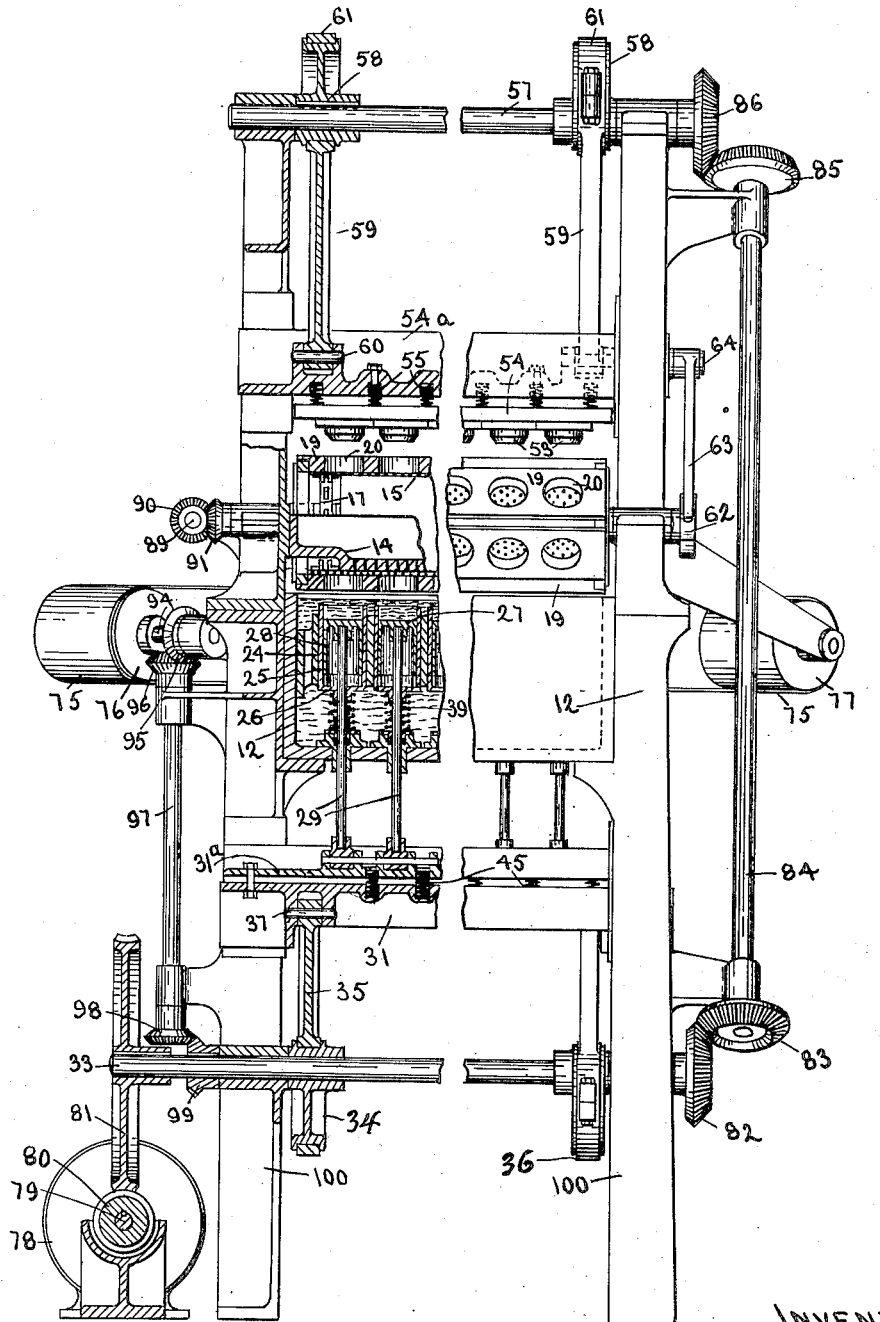
Fig. 2 is a sectional elevation on line 2—2 of Fig. 1.

The compound plunger is composed of an outer member including a tubular body portion 25 and a bottom 26, and an inner member including a head 27 and a tubular body portion 28. The inner member is fixed to a vertical rod 29 which extends through and is movable in a stuffing box 30 in the bottom of the tank 12. There is a row or series of compound plungers, and the plungers are reciprocated by mechanism including a cross head 31 (Fig. 1) to which the rods 29 are connected at 32, a horizontal shaft 33 (Fig. 2) having eccentrics 34 and connecting rods or links 35 pivoted at 37 to ears on the cross head 31 and provided with straps 36 surrounding the eccentrics 34. When the rod 29 and the cross head are depressed, the members of the plunger are below the level of the diluted pulp in the tank, and the head 27 of the inner member is below the upper end of the body 25 of the outer member as shown by Figs. 5, so that pulp fills the upper portion of the body 25 above the head 27. The bottom 26 of the outer member has a sliding fit on the rod 29 and the body 28 has a sliding fit on the body 25. The outer member is yieldingly supported by a spring 39 interposed between a shoulder 40 on the rod and the bottom 26. When the rod 29 rises the plunger members move upward in unison until the body 25 of the outer member abuts against the container plate 19 above it. The upward movement of the outer member is thus arrested and the inner member continues to rise until its head 27 compresses the charge of pulp against the perforated plate 15, the members of the plunger being now in the position shown by Fig. 5ª, so that the charge of pulp is compressed into a blank, 21, which adheres by friction to the wall of the opening and is carried forward by the movement of the chain of plates 19 which takes place after the compound plunger is depressed.

The liquid squeezed from the pulp escapes through ducts 42 in the head 27, and may be conducted through the bottom of the tank 12 by a duct 43 in the rod 29, said duct having branches 44 communicating with the interior of the inner member of the plunger.

The cross head 31 preferably includes an upper section 31ª yieldingly supported by springs 45 interposed between it and the body or lower portion of the cross head, provision being thus made for a slight yielding of the inner member of the plunger when its head 27 has sufficiently compressed the blank.

The chain of container plates 19 is engaged with hexagonal drums 46 and 47. The drum 46 is fixed to the outer shaft 18 and the drum 47 is fixed to a shaft 48, said shafts being journalled in bearings at opposite ends of the machine frame as shown by Fig. 1. The drum 47 is spaced from the inner shaft 18 to permit the interposition of a rotary mold-carrying drum 49 between the inner shaft 18 and the drum 47, the drum 49 being between the stretches of the chain of container plates 19.

The mold-carrying drum 49 is fixed to a shaft 50 journalled in bearings on the frame, and is rotated step by step by mechanism hereinafter described.

Each face of the mold-carrying drum is provided with a row of female molds 52 (Fig. 8) and each row of molds is held when the drum is at rest below the upper stretch of the chain of the container plates 19 in position to cooperate with a row of vertically reciprocating male molds 53, in shaping the blanks carried by a container plate 19 in the upper stretch of the chain, the blanks 21 being converted into pie plates 21ª.

The male molds which are formed to enter the openings 20 of the container plates, are fixed to a reciprocating cross head composed of a lower section 54 and an upper section 54ª the lower section being rendered yieldable by springs 55 interposed between the sections. The cross head is reciprocated in vertical guides 56 by mechanism including a shaft 57 (Fig. 2) journalled in bearings in the upper portion of the frame, and provided with eccentrics 58 and connecting rods or links 59 pivoted at 60 to the upper section 54ª of the cross head and provided with straps 61 surrounding the eccentrics 58.

The drum 49 carrying the female dies 52 is rotated step by step by mechanism including a ratchet wheel 62 (Fig. 1) fixed to the shaft 50, and a pawl 63 pivoted at 64 to the upper section 54 of the mold-carrying cross head, the pawl and ratchet being adapted to impart a partial rotation to the drum during each upward movement of the cross head. The plates 21ª are ejected from the female molds at the lower side of the drum 49 by ejecting heads 66 (Fig. 8) adapted to be stored in recesses in the bottoms of the female molds, and provided with stems 67 which are radially movable in guides 68 and 69. Levers 70 fixed to rock shafts 71 journalled in the ends of the drum 49 are engaged with the stems 67 and arranged to be displaced by the projection 73 on the frame. The drum rotates in the direction of arrow X (Fig. 8) and the arrangement is such that when an arm 72 encounters the projection 73, the levers 70 connected with that arm are moved to project the heads 66 from the lower face of the drum 49.

The ejected plates drop upon the upper stretch of a diagonally arranged conveyor belt 75 (Fig. 3) and are carried thereby outward from the machine. The belt 75 runs on pulleys 76 and 77 and is driven as hereinafter described.

The driving mechanism which imparts movement to the above described elements is preferably organized as next described. An electric or other motor 78 (Fig. 1) has a driving shaft 79 carrying a worm 80. Said worm engages with a worm gear 81 fixed to the shaft 33. To said shaft is fixed a bevel gear 82 meshing with a bevel gear 83 fixed to one end of an inclined transmitting shaft 84. To the opposite end of the shaft 84 is fixed a bevel gear 85 meshing with a bevel gear 86 fixed to one end of the shaft 57. To the opposite end of the shaft 50 is fixed a bevel gear 87 meshing with a bevel gear 88 fixed to a horizontal shaft 89 at the opposite side of the frame from the shaft 84. To the shaft 89 is fixed a bevel gear 90 meshing with a bevel gear 91 fixed to the shaft 18, and a bevel gear 92 meshing with a bevel gear 93 fixed to the shaft 48. The pulley 76 of the conveyor belt operating means has a shaft 94 to which is fixed a bevel gear 95 meshing with a bevel gear 96 fixed to the shaft 97 on the opposite end of which is a bevel gear 98 meshing with a gear 99 on shaft 33. The frame of the machine preferably includes a standard 100 at one end supporting the tank 12, and a standard 101 at the other end.

The operation of the machine may be briefly recapitulated as follows: The compound plunger in rising from the depressed position shown by Fig. 5 forms a row of blanks 21, immediately above the tank 12, the chains of perforated plates 15 and container plates 19 being at rest. The plunger then descends and the said chains are moved progressively a short distance and then stopped. The plunger then rises and forms another row of blanks. This operation is repeated indefinitely, each row of blanks being interposed in turn between the female and male molds. The step by step rotation of the drum carrying the lower molds causes the ejection of the formed articles from the lower side of the drum and the ejected articles are delivered by the conveyor belt at a point outside the frame. The fixed bar 14 constitutes a downwardly facing press bed and cooperates with the margins of the openings 20 in a container plate under the press bed in forming a series of mold cavities in which charges of pulp are compacted to form a blank by the plunger heads 27 which I hereinafter refer to as press platens. The said mold cavities and platens are adapted to form the blanks 21 without the cooperation therewith of the perforated plates 15, the chief function of said plates being to receive some of the water expressed from the pulp during the operation of forming the blanks. I do not therefore limit myself to the employment of the perforated plates 15 although I prefer to employ the same. As indicated by dotted lines in Fig. 5, the bar or press bed 14 may be provided with orifices 14$^a$ arranged to register with the orifices of the perforated plates and permit the escape of some of the expressed water. The container plates 19 connected in an endless chain and moved progressively step by step to constitute a carrier adapted to transfer the blanks 21 to the upper stretch of the chain and to position it to be converted into formed articles by the dies 52 and 53.

The pressure which compacts the segregated charges of pulp into blanks 21 is exerted by the plunger heads or movable platens 27, the walls 25 of the outer members of the compound plungers performing no part of the pressing operation. The upper portions of the walls 25 constitute curbs, which confine the charges of pulp over the platens 27 when the upper portion of the compound plunger rises above the level of the liquid in the tank 12. Any other suitable means may be provided to enable the platens to force charges of pulp from the tank into the mold cavities.

I call the chain of container plates 19 the outer chain and the chain of plates 15 the inner chain, which is shorter than the outer chain. The plates 15 may be called supplemental plates to distinguish them from the container plates 19. The inner chain occupies one end portion of the space surrounded by the outer chain, the opposite end of said space being vacant or unoccupied so far as the inner chain is concerned. The supplemental plates 15 cooperate with the fixed press bed 14 in forming the bottoms of the inverted mold cavities. The supplemental plates may perform this function without being perforated, although I prefer to perforate them. The supplemental plates moving with the container plates and contacting with the blanks 21 prevent the blanks from clinging to the press bed and being distorted by the edgewise pressure of the walls of the orifices 20 thereon when the chains move. The separation of the supplemental plates from the blanks which occurs when the supplemental plates reach the unoccupied portion of the space surrounded by the outer chain leaves the blanks exposed on both sides as indicated by Figure 8 before they reach the forming dies 49 and 53.

I claim:

1. A pulp molding machine comprising an endless chain of container plates each having openings extending through it from side to side, means for supporting said chain to form a lower and an upper stretch and for moving the chain, step by step, a fixed downwardly facing press bed located above the lower stretch and arranged to coincide with a container plate when the chain is at rest, so that the bed and the margins of the openings in a container plate coinciding therewith constitute a series of inverted mold cavities, a pulp tank below the press bed, means contained in the tank for segregating charges of pulp and inserting the charges in said cavities to form blanks which are frictionally retained in the cavities, and article-forming means adapted to act on the blanks in a plate in the upper stretch of the chain to convert said blanks into formed articles.

2. A pulp molding machine substantially as specified by claim 1, the said tank-contained means including a series of reciprocating press platens adapted to enter said mold cavities and compact charges of pulp therein, and yielding means for confining charges of pulp on the upper faces of said platens.

3. A pulp molding machine substantially as specified by claim 1, the said tank-contained means including a series of reciprocating press platens adapted to enter said mold cavities and compact charges of pulp therein, and yielding means for confining charges of pulp on the upper faces of said platens, means being provided for conducting from said blanks the water expressed therefrom.

4. A pulp molding machine substantially as specified by claim 1, the said tank-contained means including a series of reciprocating press platens adapted to enter said mold cavities and compact charges of pulp therein, said platens having stems extending through the bottom of said tank, and curbs yieldingly mounted on said stems and normally projecting above the platens, said curbs being adapted to be arrested by a container plate under the press bed.

5. A pulp molding machine substantially as specified by claim 1, comprising also an endless chain of perforated plates movable in unison with said chain of container plates, each perforated plate being adapted to be interposed between said bed and a container plate, and to receive water expressed from said blanks.

6. A pulp molding machine comprising an endless chain of container plates each having openings extending through it from side to side, means for supporting said chain to form a lower and an upper stretch and for moving the chain, step by step, a fixed downwardly facing press bed located above the lower stretch and arranged to coincide with a container plate when the chain is at rest, so that the bed and the margins of the openings in a container plate coinciding therewith constitute a series of inverted mold cavities, a pulp tank below the press bed, means contained in the tank for segregating charges of pulp and inserting the charges in said cavities to form blanks which are frictionally retained in the cavities, and article-forming means including lower mold members located below the upper stretch of said chain, and reciprocating upper mold members adapted to enter the openings in a container plate in said upper stretch and force blanks therefrom against the lower mold members to convert said blanks into formed articles.

7. A pulp molding machine comprising an endless chain of container plates each having openings extending through it from side to side, means for supporting said chain to form a lower and an upper stretch and for moving the chain, step by step, a fixed downwardly facing press bed located above the lower stretch and arranged to coincide with a container plate when the chain is at rest, so that the bed and the margins of the openings in a container plate coinciding therewith constitute a series of inverted mold cavities, a pulp tank below the press bed, means contained in the tank for segregating charges of pulp and inserting the charges in said cavities to form blanks which are frictionally retained in the cavities, and article-forming means including a rotary drum interposed between the stretches of the said chain and provided with a plurality of rows of lower mold members, a row of reciprocating upper mold members adapted to enter the openings of a container plate in said upper stretch and force blanks therefrom into the lower mold members at the upper portion of the drum to convert said blanks into formed articles, and means for rotating the drum step by step to carry the formed articles to the lower portion of the drum.

8. A pulp molding machine substantially as specified by claim 7, comprising also means for ejecting the formed articles from the lower portion of said drum.

9. A pulp molding machine substantially as specified by claim 7, comprising also a conveyor belt arranged to receive the said ejected articles and deliver the same outside the machine, and means for driving said belt.

10. A pulp molding machine comprising a supporting frame, polygonal drums journalled in bearings in opposite end portions of the frame, an endless chain of container plates supported by said drums, said plates conforming to faces of the drums, each plate having openings extending through it from side to side, the arrangement being such that the chain includes lower and upper substantially horizontal stretches, a fixed downwardly facing press bed located above the lower stretch and arranged to coincide with a container plate so that the bed and the margins of the openings in a container plate coinciding therewith constitute a series of inverted mold cavities, a pulp tank supported by the frame below the press bed, operating means in the tank for segregating charges of pulp and inserting the same in said cavities to form blanks which are frictionally retained in the cavities, said operating means including reciprocating press platens adapted to enter said mold cavities and compact charges of pulp therein, said platens having rods extending through the bottom of the tank, a reciprocating cross head below the tank carrying the platen rods, article-forming means including a rotary drum supported by the frame and interposed between the chain stretches, said drum being provided with a plurality of rows of lower mold members, a row of reciprocating upper mold members adapted to enter the openings in a container plate in said upper stretch and force blanks therefrom into the lower mold members at the upper portion of the drum to convert said blanks into formed articles, a reciprocating cross head carrying the upper mold members, actuating mechanism organized to rotate one of said polygonal drums step by step to intermittently move the chain of container plates, and to continuously reciprocate the said cross heads, and connections between the cross head carrying the upper mold members and the drum carrying the lower members, organized to rotate said drum step by step.

11. A pulp molding machine substantially as specified by claim 10, comprising also an endless chain of perforated plates within the said chain of container plates and adapted to coincide with some of the plates of the last mentioned chain, means being provided for moving the chain of perforated plates in unison with the chain of container plates.

12. A pulp molding machine substantially as specified by claim 10, comprising also an endless conveyor belt arranged to receive formed articles from the said lower dies, and belt driving connections between the said belt and the said actuating mechanism.

13. A pulp molding machine having an endless outer chain of container plates each having openings extending through it from side to side, an endless inner chain of supplemental plates shorter than the outer chain, located within the space surrounded by the outer chain and occupying only one end portion of said space, the opposite end of said space being unoccupied by the inner chain, means for supporting said chains to form in each an upper and a lower stretch, the supplemental plates coinciding with the container plates at one end portion of the outer chain, and being out of contact with the container plates at the opposite end portion, means for moving said chain step by step, a fixed downwardly facing press bed located above the lower stretches of said chains and arranged to coincide with a container plate and the accompanying supplemental plate when the chains are at rest, the said bed and the two plates coinciding therewith constituting a series of inverted mold cavities, whereof the bed and the supplemental plate form the bottom, means for inserting charges of pulp in said cavities to form blanks, which are frictionally engaged in the cavities and are exposed at both sides in the unoccupied portion of the outer chain, and article forming means arranged and adapted to act on said exposed blanks to convert the same into formed articles.

In testimony whereof I have affixed my signature.

NAPOLEON ST. PETER.